(12) United States Patent
Lee et al.

(10) Patent No.: US 7,051,054 B1
(45) Date of Patent: May 23, 2006

(54) METHOD AND APPARATUS FOR EMULATING READ/WRITE FILE SYSTEM ON A WRITE-ONCE STORAGE DISK

(75) Inventors: Lane W. Lee, Lafayette, CO (US); Michael B. Propps, Loveland, CO (US)

(73) Assignee: DPHI Acquisitions, Inc., Boulder, CO (US)

( * ) Notice: Subject to any disclaimer, the term of this patent is extended or adjusted under 35 U.S.C. 154(b) by 315 days.

(21) Appl. No.: 09/583,133

(22) Filed: May 30, 2000

(51) Int. Cl.
G06F 12/00 (2006.01)
G06F 17/30 (2006.01)

(52) U.S. Cl. .................... 707/205; 707/203; 707/204
(58) Field of Classification Search ............. 707/1–206
See application file for complete search history.

(56) References Cited

U.S. PATENT DOCUMENTS

| | | | |
|---|---|---|---|
| 4,420,828 A | | 12/1983 | Yoshida et al. ............... 369/47 |
| 4,791,627 A | | 12/1988 | Yonezawa ................... 369/109 |
| 4,827,462 A | * | 5/1989 | Flannagan et al. ........ 369/30.09 |
| 4,866,692 A | | 9/1989 | Saito et al. .................... 369/59 |
| 4,901,300 A | | 2/1990 | Van Der Zande et al. .... 369/47 |
| 4,960,680 A | | 10/1990 | Pan et al. .................... 430/346 |
| 4,972,401 A | | 11/1990 | Carasso et al. ............... 369/59 |
| 4,981,743 A | | 1/1991 | Ho .............................. 428/64 |
| 4,987,533 A | * | 1/1991 | Clark et al. .............. 369/30.28 |
| 5,023,854 A | | 6/1991 | Satoh et al. ................... 369/32 |
| 5,023,856 A | | 6/1991 | Raaymakers et al. ......... 369/32 |
| 5,029,125 A | * | 7/1991 | Sciupac ...................... 365/218 |
| 5,040,110 A | * | 8/1991 | Miki et al. .................. 707/200 |
| 5,073,887 A | * | 12/1991 | Takagi et al. ............... 369/100 |

(Continued)

FOREIGN PATENT DOCUMENTS

EP 0284037 3/1988

(Continued)

OTHER PUBLICATIONS

Garfinkel, S.L and J.S. Love "A File System for Write-Once Media", MIT Media Lab, Oct. 1985.*

(Continued)

*Primary Examiner*—Luke S Wassum
(74) *Attorney, Agent, or Firm*—Jonathan W. Hallman; MacPherson Kwok Chen & Heid (57) ABSTRACT

A method and apparatus for storing, updating, adding, deleting, and locating file system objects on a WORM storage medium, wherein information can be written to, but not erased from, the storage medium. The WORM storage medium has a writeable area that includes a system area and a data area. The system area includes system information regarding the file system objects on the storage medium. A system sector is written starting at one end of the system area, while the content of the file system objects is written in the data area starting at another end of the writeable area. When a change is made to the file system objects in the writeable area, an updated system sector is generated that replaces the previous file system information for those modified file system objects. Since the previous system sector is not erasable, the updated system sector is written in a location in the system area where it will be read before any previous system sectors. The updated system sector overrides file system information in previously generated system sectors. The information required to access all the file system objects on the storage medium may be included in the updated system sector, or in the updated system sector along with one or more of the previously generated system sectors.

12 Claims, 10 Drawing Sheets

U.S. PATENT DOCUMENTS

| | | | | |
|---|---|---|---|---|
| 5,080,736 | A | | 1/1992 | Matsui .................. 156/64 |
| 5,113,512 | A | * | 5/1992 | Miki et al. ................ 711/206 |
| 5,210,734 | A | * | 5/1993 | Sakurai ................ 369/47.16 |
| 5,247,494 | A | | 9/1993 | Ohno et al. .................. 369/13 |
| 5,339,301 | A | | 8/1994 | Raaymakers et al. ........ 369/50 |
| 5,347,651 | A | * | 9/1994 | Burke et al. ............... 707/205 |
| 5,377,178 | A | | 12/1994 | Saito et al. ................ 369/124 |
| 5,446,857 | A | * | 8/1995 | Russ ......................... 711/100 |
| 5,448,728 | A | * | 9/1995 | Takano et al. ............ 707/205 |
| 5,491,807 | A | * | 2/1996 | Freeman et al. ........... 360/72.1 |
| 5,539,724 | A | | 7/1996 | Ohtomo .................. 369/275.4 |
| 5,630,115 | A | * | 5/1997 | Mikamo .................... 707/205 |
| 5,634,050 | A | * | 5/1997 | Krueger et al. ............ 707/200 |
| 5,654,947 | A | | 8/1997 | Roth et al. .................... 369/48 |
| 5,656,348 | A | | 8/1997 | Kudo et al. ................ 428/641 |
| 5,666,531 | A | * | 9/1997 | Martin ....................... 707/204 |
| 5,677,953 | A | | 10/1997 | Dolphin ......................... 380/4 |
| 5,682,365 | A | | 10/1997 | Carasso et al. ............... 369/54 |
| 5,709,764 | A | | 1/1998 | Funawatari et al. ..... 156/275.7 |
| 5,754,351 | A | * | 5/1998 | Kuen et al. ................... 360/48 |
| 5,774,440 | A | | 6/1998 | Kimura et al. ................ 369/59 |
| 5,787,460 | A | | 7/1998 | Yashiro et al. ............. 711/114 |
| 5,850,382 | A | | 12/1998 | Koishi et al. ........... 369/275.3 |
| 5,874,147 | A | | 2/1999 | Bojarczuk, Jr. et al. .... 428/641 |
| 5,886,985 | A | | 3/1999 | Kobayashi et al. ...... 369/275.3 |
| 5,931,935 | A | | 8/1999 | Cabrera et al. ............. 710/260 |
| 5,978,812 | A | * | 11/1999 | Inokuchi et al. ............ 707/200 |
| 5,999,504 | A | | 12/1999 | Aoki ........................... 369/47 |
| 6,091,686 | A | | 7/2000 | Caffarelli et al. ............. 369/58 |
| 6,108,285 | A | * | 8/2000 | Freeman et al. ............ 707/200 |
| 6,117,185 | A | | 9/2000 | Schmidt ........................ 717/9 |
| 6,125,100 | A | | 9/2000 | Sensyu .................... 369/275.3 |
| 6,153,063 | A | | 11/2000 | Yamada et al. ......... 204/192.2 |
| 6,160,778 | A | | 12/2000 | Ito et al. ......................... 369/54 |
| 6,243,340 | B1 | * | 6/2001 | Ito et al. .................. 369/53.19 |
| 6,256,642 | B1 | * | 7/2001 | Krueger et al. ............. 707/205 |
| 6,351,447 | B1 | | 2/2002 | Takagi et al. ............ 369/275.3 |
| 6,389,427 | B1 | | 5/2002 | Faulkner .................. 707/104.1 |
| 6,452,897 | B1 | | 9/2002 | Van Den Enden ....... 369/275.1 |

FOREIGN PATENT DOCUMENTS

| | | |
|---|---|---|
| EP | 0 301 829 | 7/1988 |
| EP | 0 301 866 | 7/1988 |
| EP | 0 284 037 A2 | 9/1988 |
| EP | 0 350 920 | 7/1989 |
| EP | 0 386 971 | 3/1990 |
| EP | 0 802 530 | 11/1990 |
| EP | 0448378 | 3/1991 |
| EP | 0 475 197 | 8/1991 |
| EP | 0 448 378 A2 | 9/1991 |
| EP | 0 488 388 | 11/1991 |
| EP | 0 466 389 A2 * | 1/1992 |
| EP | 0 555 486 | 8/1992 |
| EP | 0 541 219 | 9/1992 |
| EP | 0643388 | 8/1994 |
| EP | 0676761 | 10/1994 |
| EP | 0 643 388 A1 | 3/1995 |
| EP | 0 718 827 | 6/1995 |
| EP | 0 676 761 A1 | 10/1995 |
| EP | 0730274 | 2/1996 |
| EP | 0730274 A2 | 9/1996 |
| EP | 0 786 767 | 1/1997 |
| EP | 0 840 296 | 10/1997 |
| EP | 0 969 452 | 12/1997 |
| GB | 2 203 886 | 10/1988 |
| GB | 2 322 555 | 9/1998 |
| WO | WO 00/72312 | 11/2000 |
| WO | WO 00/79526 | 12/2000 |
| WO | WO 01/06510 | 1/2001 |
| WO | WO 01/06511 | 1/2001 |
| WO | 01/93262 A2 | 5/2001 |
| WO | WO01/93262 | 12/2001 |

OTHER PUBLICATIONS

Garfinkel, S.L. "DRAFT: The Story of the Write-Once File System", Brown University, Aug. 1, 1987.*

Gait, J. "The Optical File Cabinet: A Random-Access File System for Write-Once Optical Disks", Computer, vol. 21, No. 6, Jun. 1988, pp. 11-22.*

Levy, J.A. and W. Wang "A File Structure for Non-Erasable Media", Proceedings from the 9th IEEE Symposium on Mass Storage Systems, Oct. 31,-Nov. 3, 1988, pp. 72-76.*

Quinlan, S. "A Cached WORM File System", Software-Practice and Experience, vol. 21, No. 12, Dec. 1991, pp. 1289-1299.*

Peterson, W. Wesley et al., "Error-Correcting Codes", The Massachusetts Institute of Technology, Second Edition (1991), pp. 222 and 223.

Couch, Leon W. II, "Digital and Analog Communication Systems", Macmillan Publishing Company, Third Edition (1990), pp. 497-508.

Patent Abstracts of Japan, vol. 010, No. 198 (P-476), Jul. 11, 1986, & JP 61 039987 A (Hitachi LTD), Feb. 26, 1986, abstract.

IBM Technical Disclosure Bulletin, XP 002183288, "Defect Skipping Among Fixed Length Records in Direct Access Storage Devices", vol. 19, No. 4, Sep. 1976, pp. 1424-1426.

IBM Technical Bulletin, XP 000588138, "Method, System and Interface for Mapping Tracks in No-ID Disk Drives", vol. 38, No. 12, Dec. 1995, pp. 275-277.

IBM Directory Maintenance VM/ESA, Diagnosis Reference, Jul. 1999, International Business Machines Corporation, Version 1, Release 5, p. 104.

ECMA: "Volume the File Structure of Read-Only and Write-Once Compact Disk Media for Information Interchange", Standard ECMA-168, 2nd Edition—Dec. 1994, pp. 1-128, XP002183920.

ECMA: "120 mm DVD Rewritable Disk (DVD-RAM)", Standard ECMA-272, 2nd Edition—Jun. 1999, pp. 1-99.

ECMA: "Data Interchange on 120 mm Optical Disk Using +RW Format—Capacity: 3,0 Gbytes and 6,0 Gbytes", Standard ECMA-274, 2nd Edition—Jun. 1999, pp. 1-90.

ECMA: "80 mm (1,23 Gbytes per side) and 120 mm (3,95 Gbytes per side) DVD-Recordable Disk (DVD-R)", Standard ECMA-279, Dec. 1998. pp. 1-114, XP002183289.

Hewlett-Packard Company, "Safeguarding Data with WORM; Technologies, Processes, Legalities and Standards", 1999.

* cited by examiner

METHOD AND APPARATUS FOR EMULATING READ/WRITE FILE SYSTEM ON A WRITE-ONCE STORAGE DISK

CROSS REFERENCE TO RELATED APPLICATIONS

The present Application is related to the following U.S. patent applications: application Ser. No. 09/583,448, filed May 30, 2000, entitled "DISK FORMAT FOR A STORAGE DEVICE"; application Ser. No. 09/583,390, entitled "DEFECT MANAGEMENT SYSTEM FOR A STORAGE DEVICE", filed May 30, 2000, now abandoned, and application Ser. No. 09/539,841, filed Mar. 31, 2000, entitled "FILE SYSTEM MANAGEMENT EMBEDDED IN A STORAGE DEVICE"; each of which applications is assigned to the assignee of the present invention and each of which is hereby incorporated herein by reference in its entirety.

FIELD OF THE INVENTION

This invention relates generally to a technique of formatting the data stored on a write-once data storage disk such that the structure of the file system can be changed to emulate a read/write disk. More specifically, this invention relates to a format for accomplishing this on an optical storage disk.

BACKGROUND OF THE INVENTION

Downloading data via computer networks such as the Internet is becoming increasingly popular. Downloaded data may include movies, music recordings, books, and other media. There are different types and sizes of memory storage devices available to users for storing and accessing the downloaded information. Devices used by consumers for playing music and movies range from home theatre systems to highly portable palmtop devices. Accordingly, there is a need to provide a storage device and storage medium that is compact and portable, yet capable of storing and transmitting large amounts of data for real-time playback. The storage device must also interface with a wide variety of hosts such as personal computer systems, televisions, audio systems, and portable music players. Further, it is important for the storage device to protect content on the storage medium using a digital rights management scheme.

Write Once Read Many (WORM) storage media may be used to meet these requirements. One example of WORM storage medium is disclosed in U.S. patent application Ser. No. 09/560,781, entitled, "WRITEABLE MEDIUM ACCESS CONTROL USING A MEDIUM WRITEABLE AREA", filed on Apr. 28, 2000, assigned to the common assignee and is incorporated in its entirety herein by reference.

Magnetic and optical data storage systems typically include a controller which interfaces the host device to the data storage device. The controller receives commands and data from, and provides status and data to, the host device. In response to the commands, the data storage device controller provides signals which control the writing of data to and reading of data from the storage medium.

In the prior art, the host device includes a disk operating system or file management system which interfaces file commands of a user (e.g., through user programs) and the commands recognized by the controller of the storage device. Tasks performed by known file management systems include keeping a directory of the location of all files of information data on the storage disk, and keeping track of remaining free space on the disk. In magnetic data storage systems, data written to the magnetic disk can be erased and rewritten, and therefore updated. The file management system therefore causes directory data to be written to predetermined locations on the magnetic disk. As files of information data are added to the magnetic disks, the file management system simply adds directory data to the reserved directory region. If a previously written file is updated, the file management system can erase and update previously written directory data.

Due to the characteristics of WORM data storage systems, the file management systems typically used with magnetic data storage systems are incapable of interfacing the host computer to a WORM disk drive. As a result, a separate file management system must be included within the host computer for WORM data storage systems. In WORM optical disk drive systems, for example, data can only be written once to any location on the optical disk. Directory data cannot, therefore, be updated on previously written locations. Each time one or more new files of information is written to the optical disk of the WORM optical data storage system, the file management system must write directory data associated with these files at a new location on the optical disk. The file management system should also write directory data in a form which enables the most recent versions of updated files to be found.

SUMMARY OF THE INVENTION

The present invention provides a method and apparatus for storing, updating, adding, deleting, and locating file system objects on a WORM storage medium, wherein information can be written to, but not erased from, the storage medium.

In one embodiment, the present invention includes a WORM storage medium with a writeable area and a system sector that includes system information regarding the file system objects on the storage medium. The system sector is written starting at one end of the writeable area, and the content of the file system objects is written starting at another end of the writeable area.

When a change is made to one or more of the file system objects in the writeable area, an updated system sector is generated that includes information on the file system objects that changed. Since the previously written system sectors are not erasable, the updated system sector is written in a location where it will be read before any previously written system sectors. Previously written sectors are read for information pertaining to file system objects that were not updated in the most recent system sector. The information included in system sectors may include, for example, the name and identifier for a new file system object, a change to the name of an existing file system object, or a parameter to indicate the fact that a file system object has been deleted.

One feature of each system sector is a header, one or more subheaders, and entries corresponding to the subheaders that include information for each file system object on the storage medium that is accessible from a host device. In one embodiment, the header includes a sector type parameter that identifies the sector as a system sector, an entry count parameter that identifies the number of file system objects that are contained within the system sector, a directory identification parameter that is used to determine when to terminate the process of reading the system sectors, a file identification parameter that is used to determine when to terminate the process of reading the system sectors, and a writeable data block number that is used to determine where the next writeable block is located within the writeable area.

In one embodiment, the subheader information for each entry includes an entry tag to identify the entry, and a parameter indicating the size, such as the number of bytes, of the entry. Each entry includes information for accessing the content of the corresponding file system object such as a type tag to indicate the type of file system object to which the entry pertains, a byte count to indicate the size of the file system object, and linkage information for file system objects that are written on multiple portions of the storage media.

The present invention advantageously emulates the capability to add, delete, and modify file system objects from the standpoint of a host system, even though information cannot be physically erased from the storage media. Thus, file system objects that were formerly accessible, but which have been marked as deleted in the updated system sector, are no longer accessible from the host system even though the content of the file system object still resides on the storage media.

This brief summary has been provided so that the nature of the invention may be understood quickly. A more complete understanding of the invention can be obtained by reference to the following detailed description of the preferred embodiments thereof in connection with the attached drawings.

BRIEF DESCRIPTION OF THE DRAWINGS

The use of similar reference numerals in different figures indicates similar or identical items.

DETAILED DESCRIPTION OF THE PREFERRED EMBODIMENTS

Figure 1:
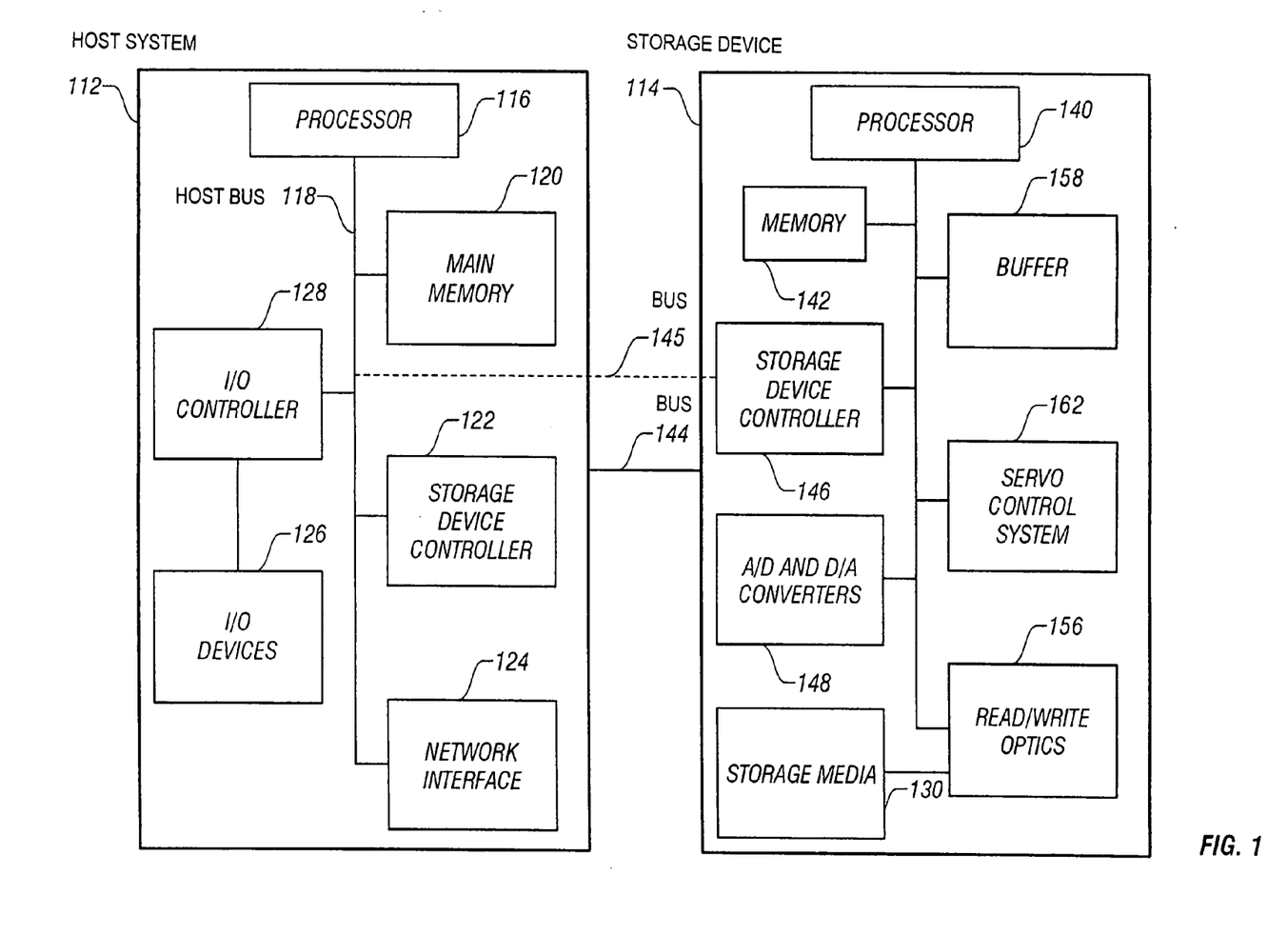
FIG. 1 is a diagram illustrating a general architecture of a host system coupled to a data storage device with which the present invention may be utilized.

FIG. 1 shows a block diagram of components comprising one example of host system 112 and storage device 114 with which the present invention may be utilized. In host system 112, one or more processors 116 are connected by host bus 118 to main memory 120, storage device controller 122, network interface 124, and input/output (I/O) devices 126, connected via I/O controller 128. Those skilled in the art will appreciate that host system 112 encompasses a variety of systems that are capable of processing information in digital format including, for example, televisions, stereo systems, handheld audio and video players, portable computers, personal digital assistants, and other devices that include information processing components.

With the present invention, information may be preloaded on storage disk 130, or a user may download information from a source, such as the Internet, using one type of host system 112. Storage disk 130 containing the downloaded information may then be removed from storage device 114 and used with another compatible storage device 114 capable of reading and/or writing to storage disk 130. Storage device 114 may be embedded in host system 112 or plugged in as an external peripheral device. Accordingly, host system 112 includes the appropriate hardware and software components to transfer, encrypt/decrypt, compress/decompress, receive, record, and/or playback audio, video, and/or textual data, depending on the functionality included in host system 112. Such components may include audio and video controllers, peripheral devices such as audio system speakers, a visual display, keyboards, mouse-type input devices, modems, facsimile devices, television cards, voice recognition devices, and electronic pen devices.

Storage device 114 includes processor 140 coupled to memory 142 which may be one or a combination of several types of memory devices including static random access memory (SRAM), flash memory, or dynamic random access memory (DRAM). Storage device 114 is coupled to host system 112 via bus 144. Alternatively, storage device 114 may be coupled directly to host bus 118 via bus 145, and the functions performed by storage device controller 122 may be performed in processor 116, or another component of host system 112.

Storage device controller 146 receives input from host system 112 and transfers output to host system 112. Processor 140 includes operating system instructions to control the flow of data in storage device 114. In one embodiment, bus 144 is an asynchronous, eight-bit data bus capable of accessing file system objects using a single identifier between host system 112 and storage device 114. A communication protocol for bus 144 is described herein below.

In one embodiment, data is transmitted to and from storage disk 130 via read/write optics 156. In other embodiments, data is transmitted to and from storage disk 130 via read/write electronics (not shown). The data may be converted from analog to digital format, or from digital to analog format, in converters 148. For example, analog data signals from read optics 156 are converted to a digital signal for input to buffer 158. Likewise, digital data is converted from digital to analog signals in converter 148 for input to write optics 156. Buffer 158 temporarily stores the data until it is requested by controller 146.

Servo control system 162 provides control signals for actuators, focus, and spin drivers that control movement of the storage disk 130.

One skilled in the art will recognize that the foregoing components and devices are used as examples for sake of conceptual clarity and that various configuration modifications are common. For example, although host system 112 is shown to contain only a single main processor 116, those skilled in the art will appreciate that the present invention may be practiced using a computer system that has multiple processors. In addition, the controllers that are used in the preferred embodiment may include separate, fully programmed microprocessors that are used to off-load computationally intensive processing from processor 116, or may include input/output (I/O) adapters to perform similar functions. In general, use of any specific example herein is also intended to be representative of its class and the non-inclusion of such specific devices in the foregoing list should not be taken as indicating that limitation is desired.

Figure 2:
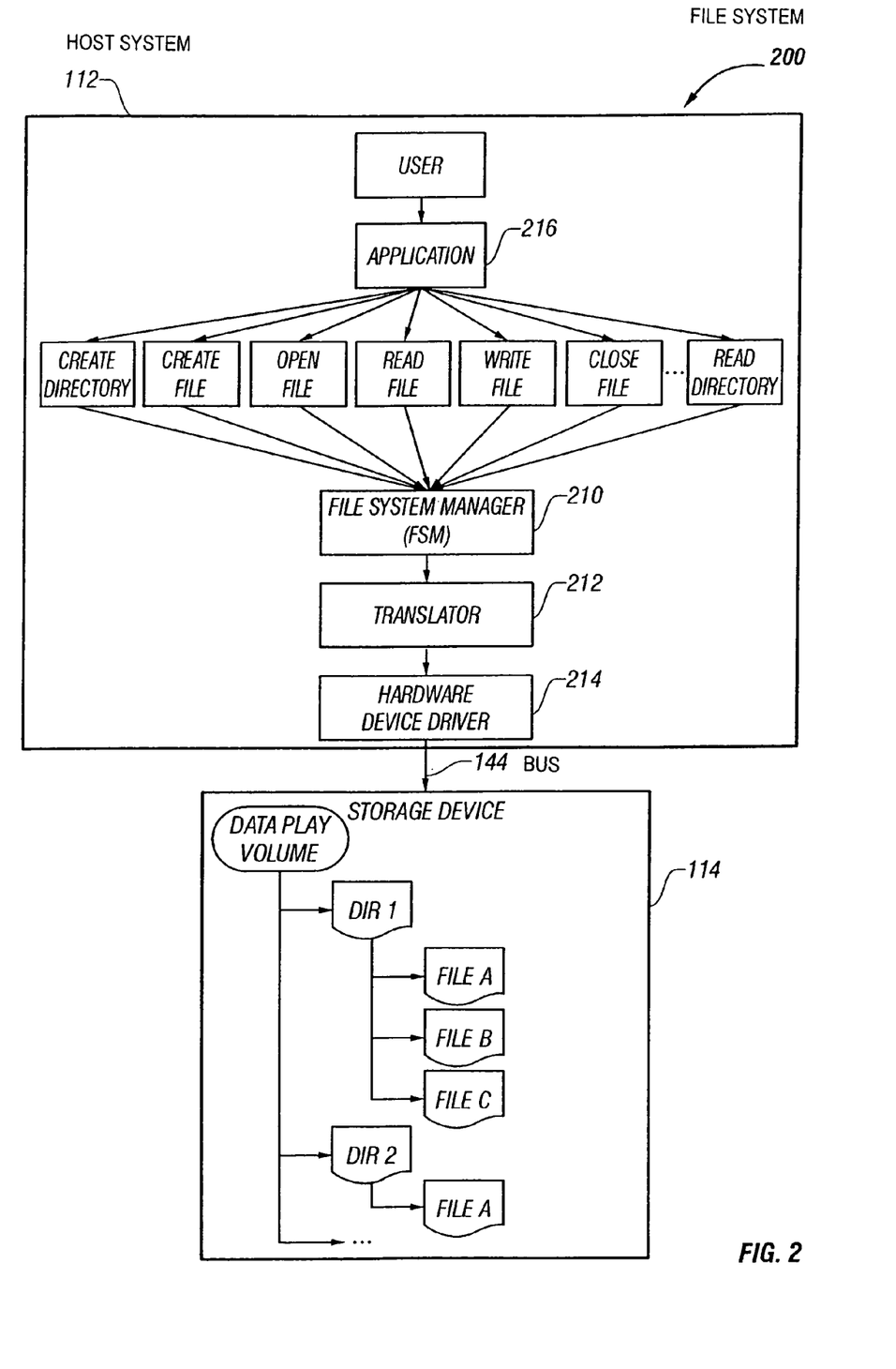
FIG. 2 is a diagram of a file system with which the present invention may be utilized.

Referring now to FIG. 2, one embodiment of a file system 200 that may be utilized with the present invention for storing information on storage device 114 is shown. Host system 112 includes file system manager 210, translator 212, and one or more device drivers 214. The number and type of device drivers 214 included depends on the types of storage devices that are interfaced with host system 112. File system 200 provides access to a fully hierarchical directory and file structure in storage devices 114, with individual files having full read and write capabilities. File system manager 210 regards storage device 114 as a volume containing a set of files and directories. These files and directories may be accessed by name or other identifier associated with that object. In one embodiment, file system manager 210 receives commands from application programs 216 to create, rename, or delete files and directories, and to read or write data to files. File system manager 210 also receives information regarding data to transmit or receive from storage device 114. This information includes the storage device and the name of the file or directory to be accessed by host system 112.

In the prior art, file and directory manipulation commands typically required full pathnames for identification. One feature of file system 200 is that file system manager 210 parses the pathnames of directories and files, and passes only the name of the directory or file to translator 212. Translator 212 converts the names to unique identifiers that are used by file system manager 210 on subsequent accesses. Translator 212 also constructs packets that include information such as file and directory identifiers to be accessed, and the commands to be performed. The packets are transmitted to hardware device driver 214, as required, depending on the commands issued by application programs 116. File system 200 is further described in the above-referenced application Ser. No. 09/539,841.

Disk Format for Writeable Mastered Media

Figure 3:
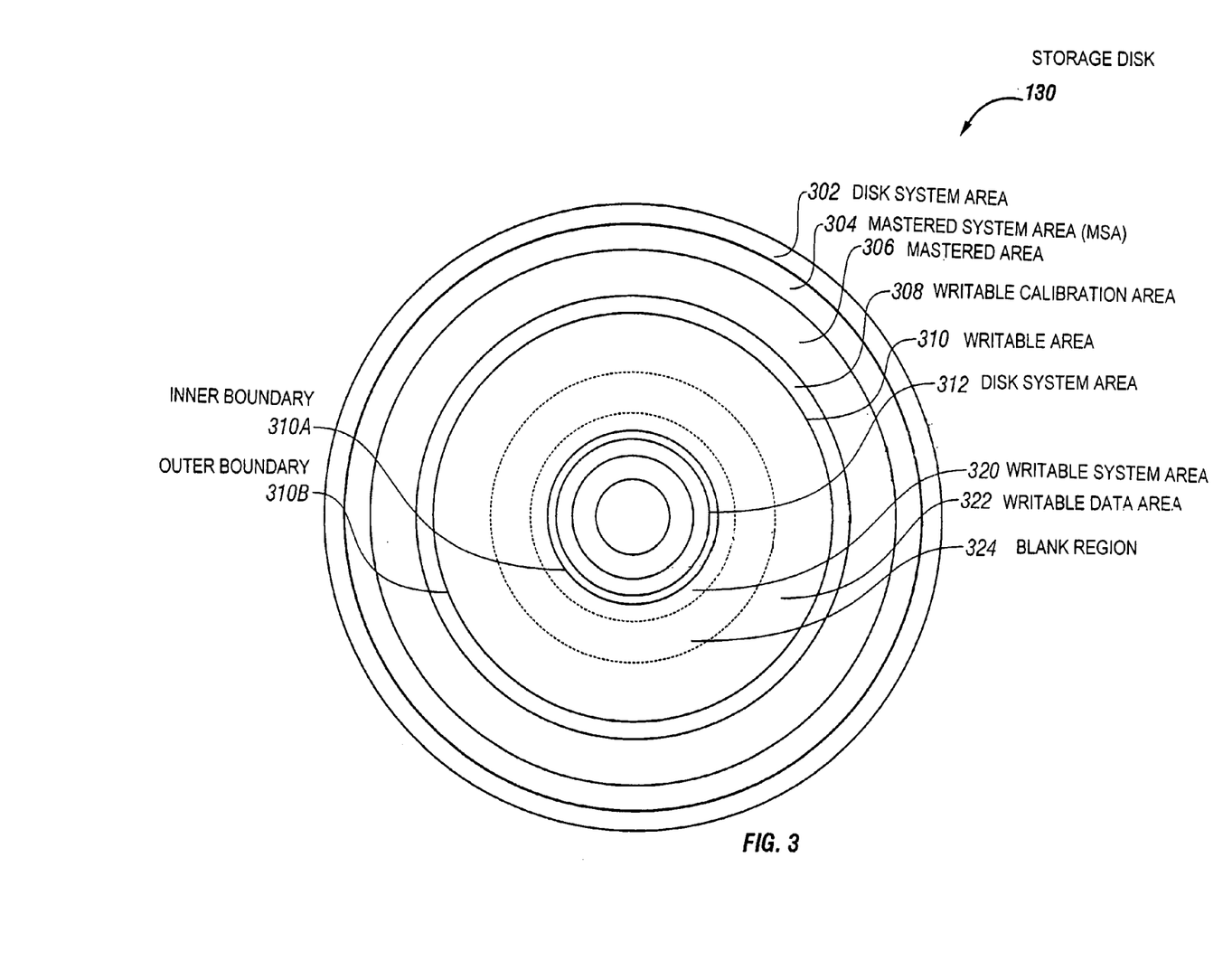
FIG. 3 illustrates a format for storing data in a data storage disk according to the present invention.

FIG. 3 shows one embodiment of a data storage disk 130 in accordance with this invention. In this embodiment, data storage disk 130 is an optical disk having at least one active layer composed of a phase-change optical material described in U.S. Patent No. 4,960,680, which is incorporated herein by reference. Writing is performed on this material essentially by heating it with a laser beam, which causes it to change from an amorphous to a crystalline phase. The reflectivity of the amorphous and crystalline phases are different, allowing the changed areas to be read. Such disks are available from Kodak. This invention is not limited to disks in accordance with the above-referenced Kodak patent, however, and is applicable to a wide variety of data storage disks, including other types of optical disks, magneto-optic disk, magnetic disks, and solid state media such as FLASH memory.

Beginning at the outer diameter, data storage disk 130 includes a lead-in and disk system area 302. The lead-in portion of area 302 is used to account for any mechanical tolerances, and for initial servo focus and tracking calibration. The disk system portion of area 302 includes the disk format characteristics (e.g., linear and radial density, scan velocity, laser wavelength, data block size), initial parameters for reading and writing data, and layout information for storage disk 130 (e.g., the starting sectors and sizes of the mastered and writeable areas). Also included in the disk system portion of area 302 is a "read channel calibration" area that is used to calibrate an optical read channel for a mastered area 306 (described below). The radius of the data storage area of disk 130, measured to the OD of area 302 could be 15.4 mm, for example.

Storage disk 130 also includes a mastered system area (MSA) 304 that stores file system objects relating to mastered content stored in mastered area 306. Mastered system area 304 stores, for example, directory information, file attributes, file size and other file system information concerning the data stored in mastered area 306. File system objects are written in MSA 304 from the outer diameter (OD) towards the inner diameter (ID) of storage disk 130. Mastered area 306 also stores mastered content from the OD towards the ID of storage disk 130. The mastered content is stored in data blocks which may be, for example, 16 K bytes in size.

In some embodiments, a duplicate of MSA 304 is created adjacent to the inward edge of mastered area 306. The duplicate MSA serves as a backup in case the first MSA 304 cannot be read. The data in mastered areas 304 and 306 is formed by an embossing process in conjunction with the manufacture of storage disk 130 and consists of a spiral track of pits or bumps. The processes used to form mastered disks (e.g., Compact Discs) are well known.

Storage disk 130 also includes a buffer and writeable calibration area 308, which separates the mastered area 306 from a writeable area 310 (described below). The buffer area can include, for example, one track of mastered sectors and three grooved tracks that are used for servo focus and tracking calibration in preparation for reading or writing data in writeable area 310. The writeable calibration area is used to calibrate the read and write channel in writeable area 310. This is required, for example, because the reflectivity of the reflective layer in the pits or bumps of the master areas 304, 306 is different from the reflectivity in the crystalline "pits" in the writeable area 310.

In contrast to the mastered areas 304, 306, no data is written in writeable area 310 at the time the disk is manufactured. Instead, the spiral track takes the form of a groove or "land" (the area between grooves) which is used by a servo system to assure that the read/write head tracks properly as the data is being written. For example, in one embodiment the groove pitch is 0.74 μm±0.03 μm, the depth of the groove is 80 nm±5 nm, the width of the groove is 440 nm±5 nm, and the groove walls are angled between 35 and 45 degrees with respect to horizontal. The servo systems used to provide tracking are widely known in the field. The groove is typically formed in a wobble that generates a sinusoidal signal used to control the rotational speed of the disk and to generate a clock signal (See, e.g., U.S. Pat. Nos. 4,972,410 and 5,682,365 to Carasso et al.) Writeable area 310 has an inner boundary 310A and an outer boundary 310B. The groove may also contain high-frequency wobble marks.

Writeable area 310 is a "write once read many" (WORM) data zone, meaning that data written in writeable area 310 cannot be erased or moved but can be read many times. When storage disk 130 is manufactured, and before any data is written to it, writeable area 310 is a single homogeneous area having a spiral groove as described above.

Inward from writeable area 310 is a second buffer area, which has the same function as the buffer area in buffer and writeable calibration area 308. Next comes a disk system area 312, which is a duplicate of the disk system area lead-in and disk system area 302 at the OD of disk 130. Disk system area 312 is used as a backup in case the disk system area lead-in and disk system area 302, cannot be read. At the ID of disk 130 is a disk format information and lead out area 128. The disk format information area is in the form of a bar code and contains basic information about the disk, such as whether it is a first, second, etc, generation disk. By reading the disk format information area, the drive can quickly determine whether it is capable of reading that media. For example, if a second generation disk is inserted into a first generation drive, the drive would be able to tell immediately that it cannot read the disk. The lead out area ends at the maximum stroke of the optical pick up unit that is used to read and write data on disk 130.

As data is written in writeable area 310, a writeable system area (WSA) 320 adjacent inner boundary 310A and a writeable data area (WDA) 322 adjacent outer boundary 310B are formed. Writeable system area 320 and writeable data area 322 are shown by the dashed lines in FIG. 3. When writeable area 310 is partially full, a blank region 324 separates writeable system area 320 and writeable data area 322.

Using this format, the data files are written in writeable data area 322 from the OD towards the ID of writeable area 310, i.e., in a direction inward from the outer boundary 310B. Information regarding the location and size of file system objects is written in system sectors that are stored in writeable system area 320. Each new sector of information is written on the spiral track which spirals in towards the ID of disk 130, but the new sector is appended to the OD side of the last sector written in writeable system area 320. Hence, writeable system area 320 grows outwards from the ID towards the OD of writeable area 310, while writeable data area 322 grows inwards from the OD towards the ID of writeable area 310. As this happens, blank region 324 shrinks in size.

Figure 3A:
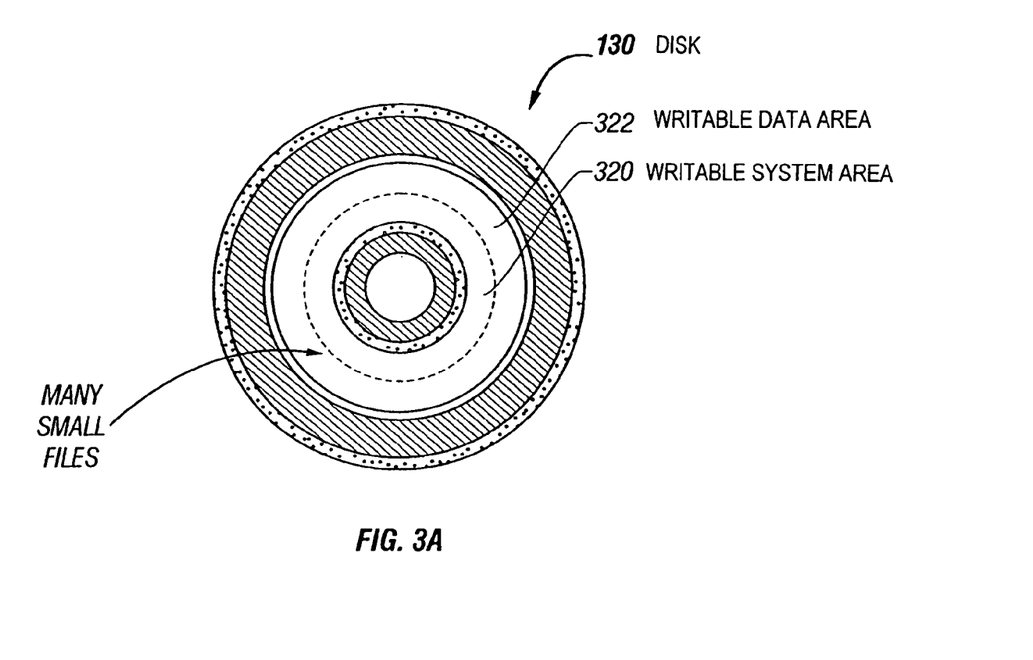
FIGS. 3A and 3B illustrate how the merger point of the writeable system area and the content in the writeable area can vary with the size of the file system objects stored on the disk.
Figure 3B:
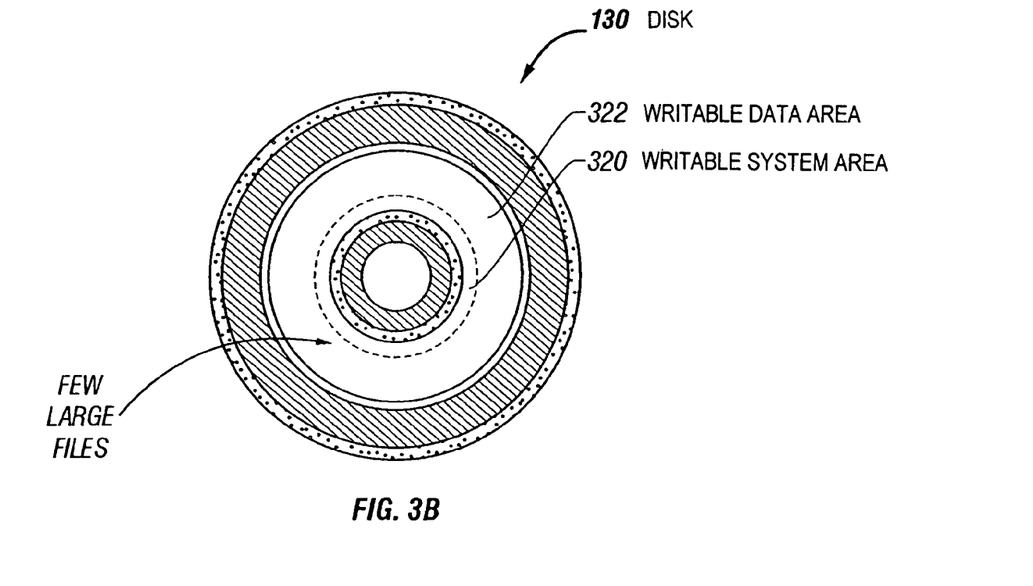

Ultimately, if data files continue to be written to disk 130, writeable system area 320 and writeable data area 322 will merge, and blank region 324 will disappear. The merger will occur at a location that is dependent upon the size of the data files written into writeable data area 322. As shown in FIGS. 3A and 3B, if numerous small data files are written in writeable data area 322, the merger will occur further away from inner boundary 310A than if a few large files are written in writeable data area 322.

For example, if a data file is 100 Megabytes in size, then a large area is required for content while a smaller area may be required for the file system information. However if there are 20 files 5 Megabytes each, then the file system data files are likely to require a larger memory storage space for storing the file system data compared to the file system data for the 100 Megabyte file. Since the areas for data files and file system information approach each other, the respective sizes of writeable system area 320 and writeable data area 322 vary to meet the needs of the particular situation. Hence, the foregoing format according to the present invention apportions the data files and file system information in writeable area 310 such that writeable area 310 as a whole is efficiently utilized.

Figure 3C:
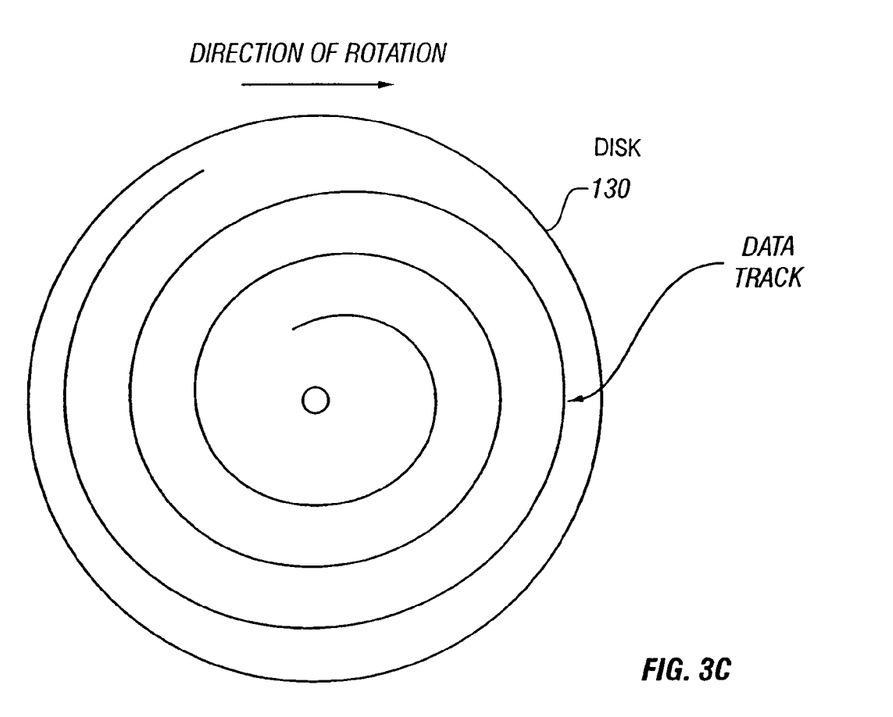
FIGS. 3C and 3D illustrate how the disk may be rotated either clockwise or counterclockwise.
Figure 3D:
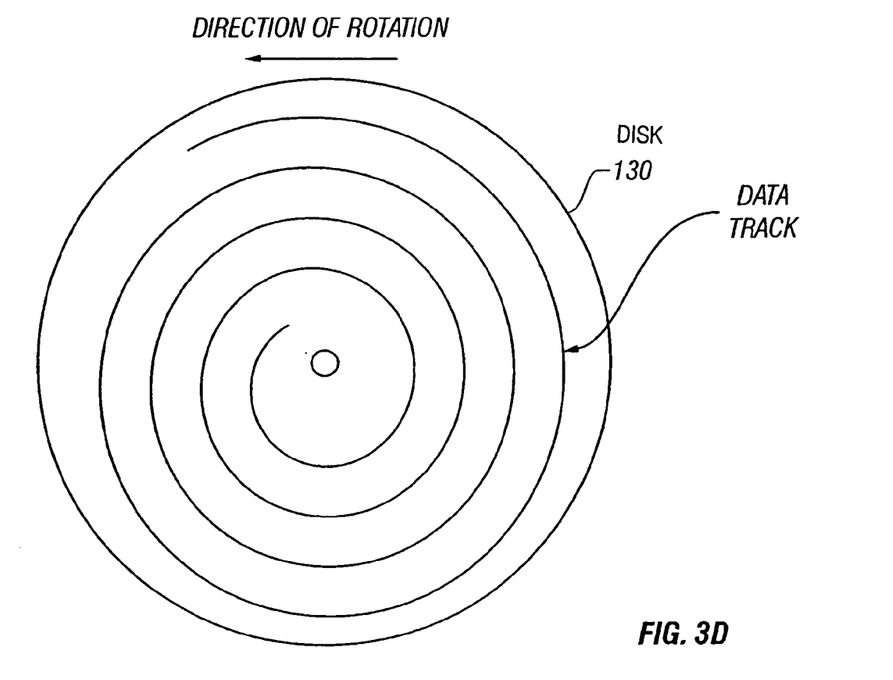

As noted above, the data stored on disk 130 is written and read in an inward direction, i.e., in a direction from the OD to the ID of disk 130. As shown in FIGS. 3C and 3D, using a spiral track, this can be with by rotating the disk in either a clockwise direction (FIG. 3C) or a counterclockwise direction (FIG. 3D). Obviously, the pitch of the track in FIGS. 3C and 3D is greatly exaggerated to illustrate the point.

Generating System Sectors

Information for file system objects is received from host system 112 and cached within memory 142 or data buffer 158 (FIG. 1). In one embodiment, a file system as disclosed in application Ser. No. 09/539,841 is utilized that includes a commit command that is issued from host system 112. The commit command causes the cached file system information to be permanently stored on storage disk 130. When a command to commit the data in memory 142 to storage disk 130 is issued from host 112 and received in storage device controller 146, the file system information for file system objects to be written or removed on storage disk 130 is generated by storage device controller 146, collected in buffer 158, and written in one or more system sectors, as described hereinbelow. In other embodiments, other file systems may be utilized, such as those that temporarily store data in host system 112, and then send it to storage disk 130 when host system 112 decides to permanently store the information. Regardless of the type of file system used in an embodiment, one or more system sectors are created. The information in the system sectors is used to locate and access content information for file system objects on storage disk 130. Typically, only one system sector is generated for each commit command, however, additional system sectors may be generated for a particular commit command depending on the number of file system objects that were updated, added, or deleted, and the amount of space allocated for each system sector.

The system sector(s) are written adjacent previously written system sectors, forming what is referred to herein as a "media stack." In the embodiment shown in FIG. 3, the most recent content information is written at the outermost area of writeable system area 320, where blank region 324 begins. Logic in storage device controller determines the amount of space required for the system sector(s) to be >written, and determines a starting place in writeable system area 320 to begin writing the system sectors so that they do not overlap the previously written system sectors.

Figure 4:
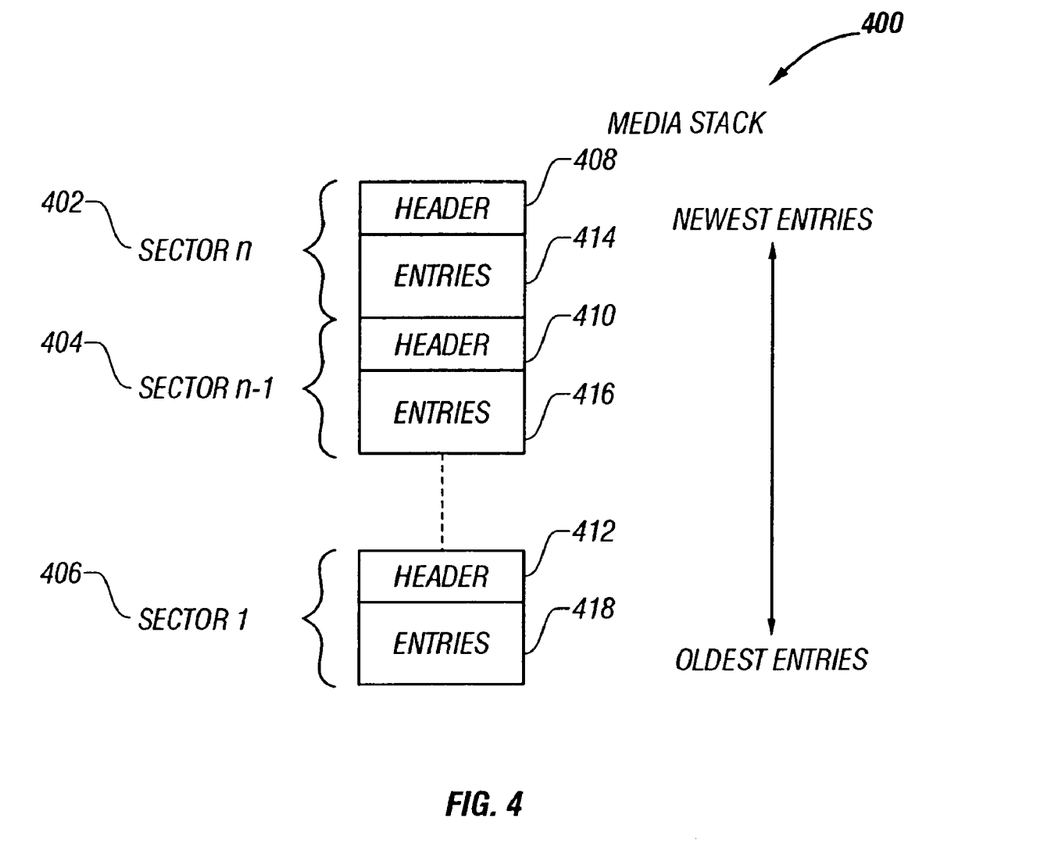
FIG. 4 shows one embodiment of a plurality of system sectors writeable system area according to the present invention.

Referring now to FIG. 4, the file system objects in writeable system area 320 can be viewed conceptually as a "media stack", with the most recently added file system sectors being near the "top" of the stack. A media stack 400 is shown with n system sectors 402, 404, 406 having headers 408, 410, 412 that hold information representing state information of storage disk 130. System sectors 402, 404, 406 may also include other information that is required to access storage disk 130, such as the location and size of defective areas on storage disk 130.

When a commit command is executed, file system object information that is being temporarily stored in memory 142 or buffer 158 is transferred to storage disk 130. Transferring the information to storage disk 130 requires generating one or more system sectors that include system information regarding the file system objects that are accessible on storage disk 130 from host system 112 (FIG. 1). Header 408 includes a sector tag to identify the sector as a system sector, the most recent data regarding the number of file system objects on storage disk 130 that are accessible from host system 112, parameters to be used to identify the next file and directory, and the location for writing the next block of data in writeable data area 322. Entry 414 includes the most recent information for accessing file system objects that were updated while executing the last commit command. System sectors 404, 406 include information from previous executions of commit commands that is useful for accessing information for file system objects residing in writeable data area 322 that were not updated during execution of the last commit command.

Each system sector 402, 404, 406 is made up of a header 408, 410, 412, followed by a number of entries 414, 416, 418, each of which has a unique tag associated with it. The information that is included in headers 408, 410, 412 and entries 414, 416, 418 is discussed hereinbelow.

Figure 5:
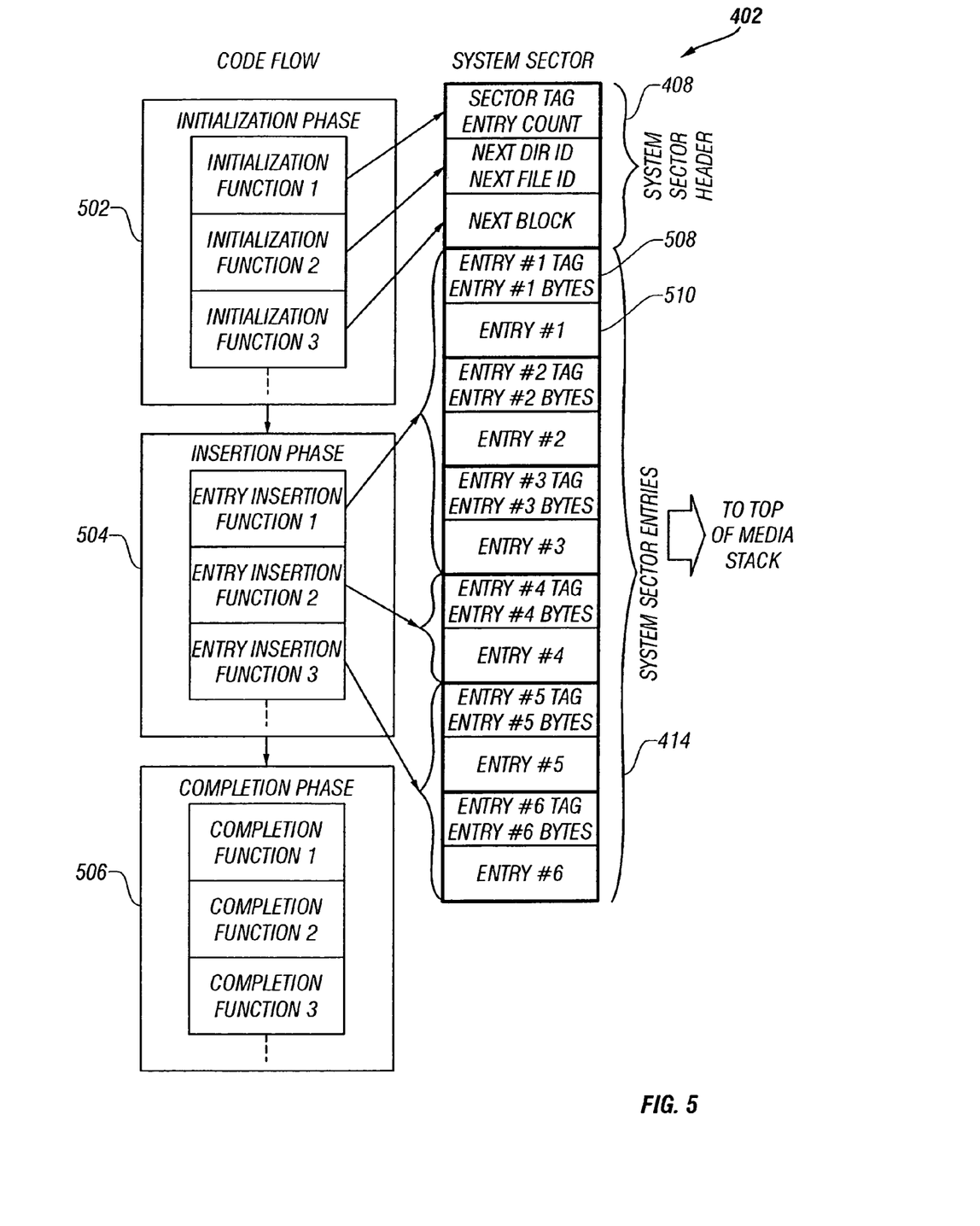
FIG. 5 shows one embodiment of components for creating a system sector according to the present invention.

FIG. 5 shows a diagram of computer-executable program instructions, represented as Initialization phase code block 502, insertion phase code block 504, and completion phase code block 506. Code blocks 502, 504, 506 may be used in embodiments of the present invention to create system sectors 402, 404, 406 with headers 408, 410, 412 and entries 414, 416, 418 when file system objects are added, changed, or deleted from writeable area 310. It is recognized that similar functions may be implemented using a different arrangement of functions, with Table 1, and FIGS. 4 and 5 being just one example of an arrangement.

One embodiment of a process for constructing and writing an updated system area sector 402 that is placed on "top" of media stack 400 is as follows:

1) A series of initialization functions, examples of which are shown in Table 1, are executed. These initialization functions are responsible for filling in header 408 according to a predefined structure, as shown by initialization phase code block 502 in FIG. 5. Header 408 includes a sector tag that identifies the information on storage media 130 as a system sector. The initialization functions also fill in values to be used as the next file system object identifiers (e.g., the next file identifier, and the next directory identifier), and the next block for writing data in writeable data area 322. Other initialization functions may be included to supply information in addition to, or instead of, the information shown in FIG. 5. In one embodiment, the functions are registered in an array of function pointers and a pointer to header 408 is passed to each function.

2) Once header 408 is initialized, a series of insertion functions, examples of which are shown in Table 1, are called. As shown by insertion phase code block 504 in FIG. 5, each insertion function is responsible for placing entries 414 into system sector 402. The entries 414 begin with a subheader, such as subheader 508, that includes an entry tag to identify the type of file system object the entry pertains to (e.g., file, directory, or defect area), and the number of bytes included in the corresponding entry, such as entry 510. Each entry includes a variety of information that depends on the type of file system object being written. This information may include, for example, the identifier that is assigned to the file system object and used by host system 112 to access the file system object, linkage information for the areas on storage disk 130 that contain the content information for the file system object, and sibling and parent information for the directory structure. The insertion functions store header 408 and entries 414 in temporary memory until the system sector is full, at which point the sector is written to storage disk 130 in writeable system area 320. The number of entries 414 added by each entry insertion function depends on the number of file system objects that have been added or modified. The insertion functions call a routine which writes sector 402 to storage disk 130. In one embodiment, the insertion functions are also registered in an array of pointers.

3) A series of completion functions, examples of which are shown in Table 1, are called. As shown by completion phase code block 506 in FIG. 5, these functions are called after system sector 402 has been successfully written to storage disk 130, and mark each entry as having been written successfully to storage disk 130.

TABLE 1

Examples of Initialization, Insertion, and Completion Functions

| Function Names | Description |
| --- | --- |
| Initialization Phase: System Header Initialization | Initializes system header 408 with a sector tag, entry count, next file identifier, next directory identifier, and next block number for writing in writeable data area 322. |
| Insertion Phase: Entry Insertion Functions 1, 2, . . . n | Initializes subheaders with entry tags and sizes of entries and collects information for entries 414, depending on type of file system object being written, and writes sector 402 to writeable system area 320 when the sector is finished or becomes full. |
| Completion Phase: Completion Functions 1, 2, . . . n | Handler functions that are called when insertion is complete to mark entries as having been successfully written to storage disk 130. |

In order to handle special conditions during the read/write of the writeable system area 320, in one embodiment, a set of flags is defined that track the current state of the writeable area 320 and mastered area 304 read or write operations. These flags are used, for example, by routines in Initialization Phase code block 502, Insertion Phase code block 504, and Completion Phase code block 506 (see FIG. 5). Table 2 shows an example of a set of flags and bit settings that may be utilized with the present invention to provide indications of the amount of information to be written, which system area is being accessed, i.e., mastered system area 304 or writeable system area 320, and whether data is being read from the system header 408.

TABLE 2

System Area Flags

| Name | Description |
| --- | --- |
| System Area Block Size | The size of the block to be read or written. |
| Mastered System Area Flag | 0 = The commands are working within writeable system area 320.<br>1 = The commands are working within the Mastered System Area 304. |
| First Block Flag | The data being read is from the system header 408 of the most recent system sector 402 in writeable system area 320, or mastered system area 304. |

Table 3 shows an example of a structure for system header 408 that is included in each header 408, 410, 412 and is placed on the front of every system area sector 402, 404, 406. This information is filled in by the System Header Initialization functions (See Table 1).

TABLE 3

System Area Header Structure

| Name | Description |
| --- | --- |
| Sector Tag | Tag telling the sector type, e.g. mastered system area 304 or writeable system area 320. |
| Entry Count | Number of entries in the system sector |
| Next Directory ID | The next available directory identifier to be given to the next directory created within the file system. |
| Next File ID | The next available file identifier to be given to the next file created within the file system. |

TABLE 3-continued

System Area Header Structure

| Name | Description |
| --- | --- |
| Next Data Block | Next writeable data block number where the next file system object can be written in writeable data area 322. |

Table 4 shows an example of type tag values that are stored in the subheader 508 for each of entries 414 within system sector 402. Additional tags may be defined for future expansion.

TABLE 4

System Entry Type Tags

| Value | Name | Description |
| --- | --- | --- |
| 0 | Directory_Entry | The entry is a directory entry. |
| 1 | File Entry | The entry is a file entry. |
| 2 | Defect Entry | The entry is a defect map entry. |

The foregoing format provides flexibility for adding, changing, and removing file system objects on storage disk 130. When a change is made in content information, a new system sector 402 is created and written to the writeable system area 320 of writeable area 310.

Reading Data from System Sectors

Media stack 400 is read from top to bottom (i.e., from OD to ID of writeable system area 320). Information for accessing the most recent version of a file system object is provided in the first occurrence of the system sector, i.e. sector 402. Older information for accessing a particular file system object may be listed in previously written sectors 404, 406. Older information is ignored if it is made obsolete by the newer information for accessing the file system object included in system sector 402.

Figure 6:
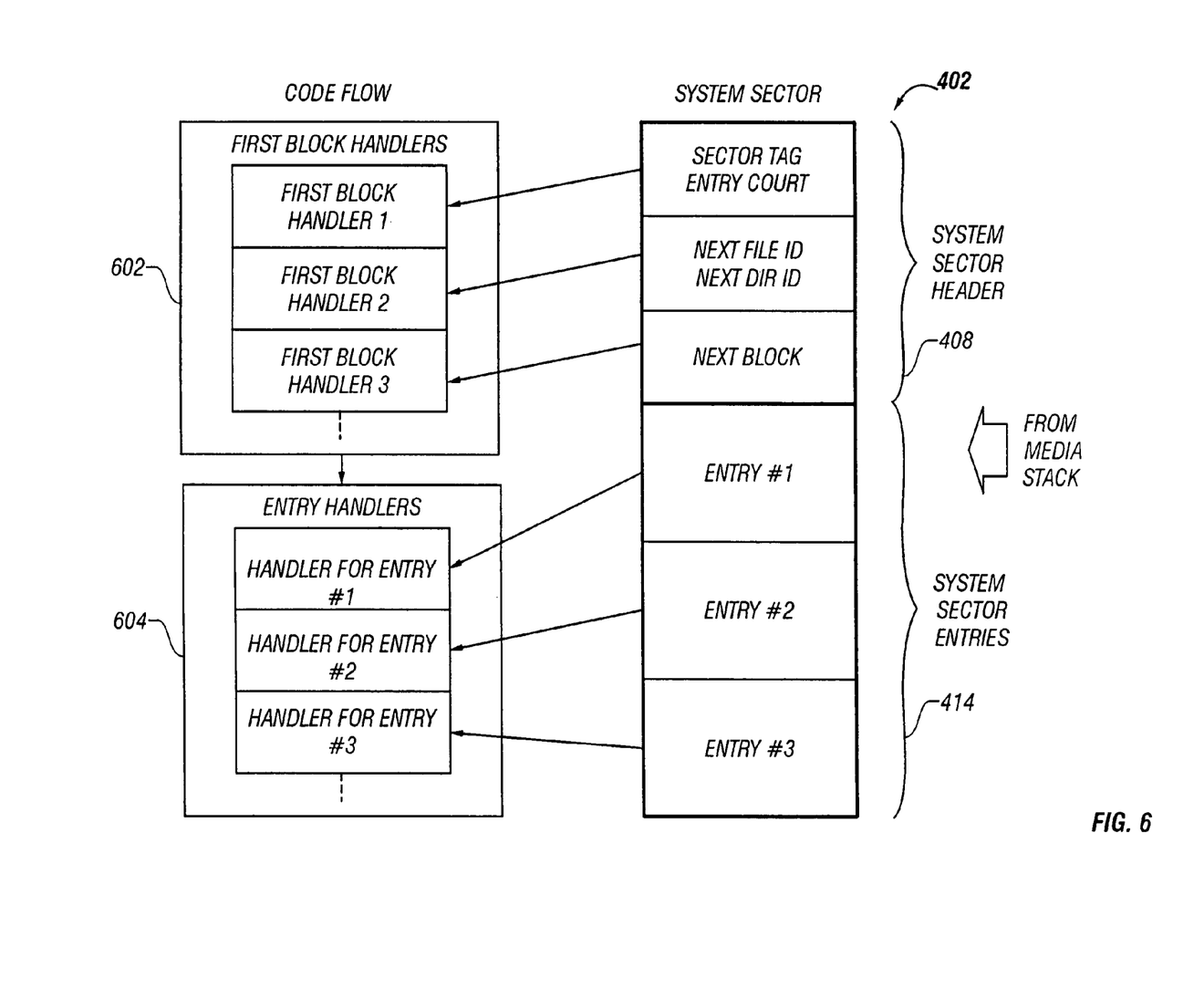
FIG. 6 shows one embodiment of components for reading system sectors according to the present invention.

Referring now to FIGS. 4, 5, and 6, system sector 402 contains the most recent file system data as filled in by initialization and insertion functions in code blocks 502 and 504 during the write process. The following process may be used to read data out of system sector 402:

1) The first block read from the writeable system area 320 contains the most recently written system sector 402 to be found on storage disk 130 (FIG. 3). A series of functions, referred to as "first block handlers" 602 are called to read the information in header 408. Handlers 602 are registered in an array of function pointers and accept a pointer to system header 408.

2) Each entry in entries 414 within system sector 402 has a tag value associated with it which was added during the insertion phase 504 of the sector generation process. For each type of entry in entries 414, there is a corresponding entry handler function 604. As entries 414 are read, they are sent to their corresponding entry handler function 604, according to the tag that is stored with the particular entry 414. The association of tags to handler functions 604 in the present invention is created using an array of pointers to handler functions 604, where the tag value is used as an index into the array.

An advantage of attaching a tag to each entry 414 is that the read-back routine does not have to understand the type of entry that it is processing, it simply looks at the tag and sends the entry 414 to the function 604 associated with the tag. Another advantage is that additional entry types may be created by using the next available tag number, and providing a new insertion function 504 and new handler function 604 to read that entry type.

Media Stack 400 allows for optimization of the process for reading file system objects. Based upon information stored in the topmost system sector header 408, the read process may stop when all the relevant entries 414 have been accounted for, even though every sector 402, 404, 406 in media stack 400 has not been read. In the present invention, this is achieved by counting the number of file system objects that are read from media stack 400, and when the values of Next Directory Identification and Next File Identification from the topmost system header 408 have been reached, the read process is terminated.

Figure 7:
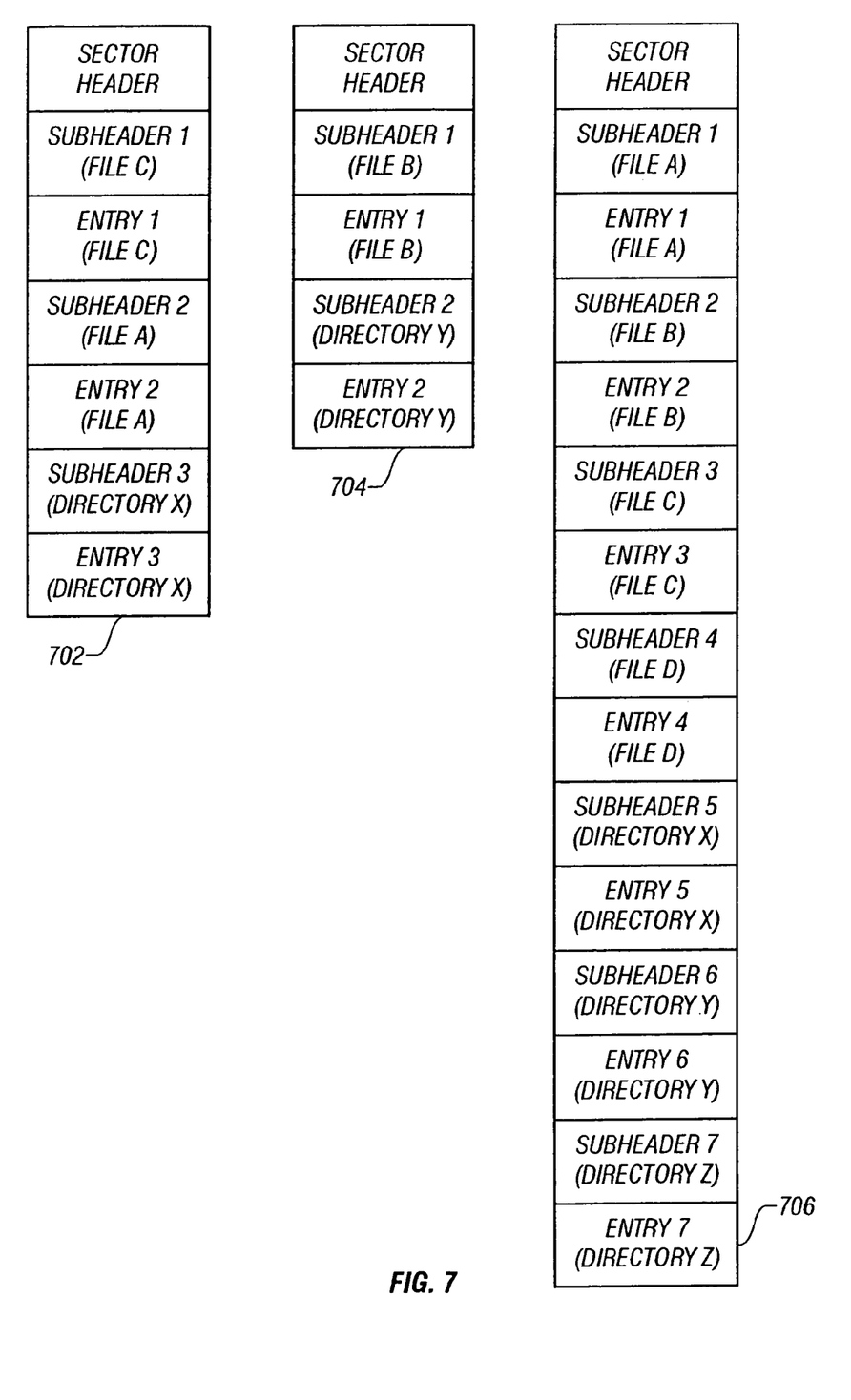
FIG. 7 is a diagram of an example of three system sectors in a writeable system area.

An example of the process of finding a file system object with one embodiment of the present invention will now be explained with reference to FIGS. 7 and 8. FIG. 7 shows a set of three system sectors 702, 704, 706 that are included in a media stack. System sector 702 is the most recently written sector, sector 704 is the next to most recently written sector, and sector 706 was written prior to sector 704. Sector 706 includes subheader and entry information for accessing Files A, B, C, D, and Directories X, Y, and Z. As a result of updates to certain file system objects, sector 704 includes subheader and entry information for accessing File B and Directory Y, and sector 702 includes subheader and entry information for accessing File A and C, and Directory X.

With the present invention, only sector 702 is read to access File A, File C, or Directory X. To access File B or Directory Y, sectors 702 and 704 are read. To access File D or Directory Z, sectors 702, 704, and 706 are read until the desired file system object is found.

The steps to find an entry in media stack 400 (FIG. 4) according to the present invention is summarized in pseudo-code as:

```
while (object not found) and (system sectors available)
    Read next system sector
    Get number of entries in the system sector from the header
    For (each entry in the header)
        if (Current entry ID equals Desired entry ID)
            Set Object found flag
```

It should be noted that this same mechanism can be used to load entries from the media stack into memory, and then access the objects from memory.

Figure 8:
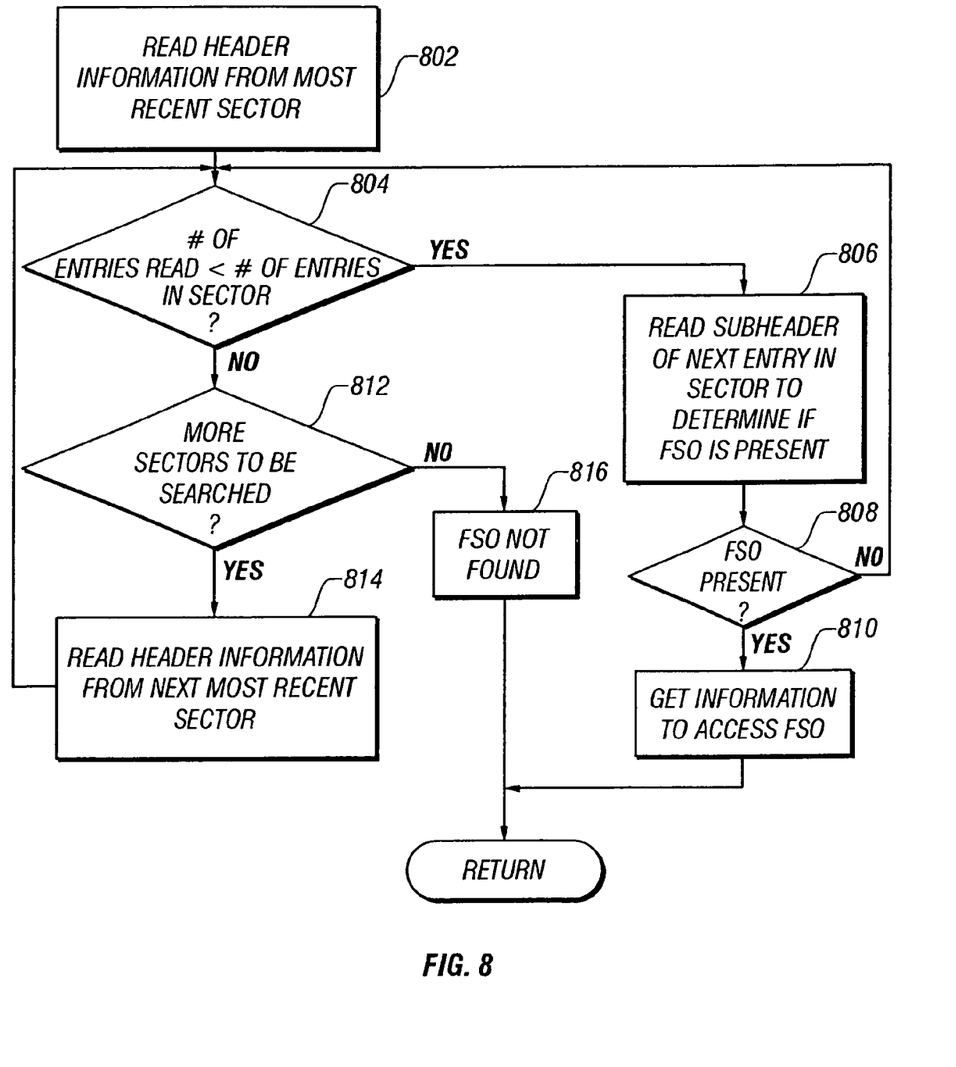
FIG. 8 is a flowchart of one embodiment of a method for reading system sectors.

FIG. 8 shows a flowchart of a general scheme for finding entries in media stack 400 (FIG. 4) for accessing file system objects (FSOs) according to the present invention. In step 802, the system header information from the most recent sector is read to obtain the number of file system objects (e.g., files and directories) for which information is available in the sector.

In step 804, if the number of file system object subheaders read is less than the number of file system objects for which access information is available in the sector, then the next subheader is read in step 806 to determine if information for accessing the desired file system object is included in the sector. If so, then the information for accessing the file system object is read from the entries corresponding to the subheader as shown in step 810.

If the subheader does not pertain to information for accessing the desired file system object, then steps 804 and 806 are executed until either the information for accessing the file system object is found in the sector, or the number of file system object subheaders read is greater than or equal to the number of file system objects for which access information is available in the sector. In the latter case, a check is made in step 812 to determine whether there are any previously written sectors to search. If so, then step 814 is executed to read information from the next most recent sector. This information is used to reset the parameters for the number of file system objects for which there is information available in the next sector to be searched, and control is passed to step 804. If there are no more sectors to read in step 812, then an indication that the file system object was not found is returned in step 816.

It is important to note that the file system information required to access all of the file system objects in writeable data area 322 may be included in the most recent system sector 408. Alternatively, the file system information required to access all of the file system objects in writeable data area 322 may be included in two or more system sectors 402, 404, 406. When the information is included in two or more system sectors 402, 404, 406, the first occurrence of the information for a given file system object in media stack 400 is the most recent information, and all subsequent occurrences are ignored.

Furthermore, during the system sector creation process shown in FIG. 5, extra space may be available within system sector 402 after all the modified entries 414 have been inserted by the insertion functions 504. In one embodiment, this extra space may be filled in with older entries 416, 418 in media stack 400. This will save time during subsequent reads of media stack 400, since entries for file system objects that are still accessible will reside closer to the top of media stack 400.

Advantages

The present invention emulates the capability to add, delete, and modify file system objects from the standpoint of host system 112 (FIG. 1), even though information cannot be physically erased from storage disk 130. Thus, file system objects that were formerly accessible, but which have been marked as deleted, are no longer accessible from host system 112, even though the content of the file system object still resides in writeable data area 322 (FIG. 3). A file system object may be marked as deleted by setting an indicator, such as a flag or other variable, to a predetermined value, and writing the indicator to entry 414.

One advantage of the code flow shown in FIGS. 5 and 6 is the flexibility to insert and retrieve the plurality of data elements in header 408 and plurality of entry types in entries 414. Each insertion phase function 504 may insert separate, distinct, and variably sized entries into entries 414 without colliding with other insertion phase functions 504.

Another advantage of the functions in code block 502 is that it creates a common header 408 prior to the insertion of entries 414, hence allowing a plurality of entries 414 to share a common header 408.

Another advantage of the functions in code blocks 502, 504, 506 is that it provides a safe mechanism for the updating of internal status information upon successful writing of the entries to storage media 130. For example, if an insertion function 504 performed the status update for completion phase functions that is done in code block 506, and if a data write operation failed, then the status of entries 414 inserted into system sector 402 would incorrectly indicate a completion status. With the present invention, functions in code block 506 are assured that entries 414 have been successfully written, and hence can safely update their completion status correctly.

While the invention has been described with respect to the embodiments and variations set forth above, these embodiments and variations are illustrative and the invention is not to be considered limited in scope to these embodiments and variations. For example, the writeable system area 320 may be located at the outermost diameter of writeable area 310, while content is written starting at the innermost diameter of writeable area 310. Further, the present invention may be used in other system areas on storage disk 130 to allow modifications to the content stored on other portions of storage disk 130. One example would be using the present invention in mastered file system zone 302 and mastered area 303. Additionally, the media stack 400 may be created and managed via a host driver in host system 112 instead of in storage device 114. Accordingly, various other embodiments and modifications and improvements not described herein may be within the spirit and scope of the present invention, as defined by the following claims.

What is claimed is:

1. A method for emulating an erasable storage medium using a non-erasable optical disk, wherein the optical disk includes a writing area formed in a spiral track, the method comprising:

writing a plurality of data files in the writing area, wherein a first data file is written from a first end of the spiral track, a second data file is written from the end of the first data file on the spiral track, and so on for remaining data files;

generating a system sector for the data files, wherein the system sector identifies, for each data file, its location in the writable area and its size;

writing the system sector in the writable area, wherein the system sector is written from the remaining end of the spiral track;

generating an updated system sector whenever there is a change in the data files stored on the writable area, wherein the updated system sector identifies only, for each changed data file, its location in the writable area and its size, the unchanged data files being identified by the system sector; and writing the updated system sector in the writable area, wherein the updated system sector is written from the end of the system sector on the spiral track.

2. The method of claim 1, wherein the change is an additional data file being written in the writable area, the additional data file being written from the end of the last data file on the spiral track, and wherein the updated system sector identifies the location and size of the additional data file.

3. The method of claim 1, wherein the change is a modified data file being written in the writable area, the modified data file being written from the end of the last data file on the spiral track, and wherein the updated system sector identifies the location and size of the modified data file such that the modified data file replaces the contents of a given data file stored in the writable area.

4. The method of claim 1, wherein the change is an indication that a given data file stored in the writable area is to be considered deleted.

5. The method of claim 1, wherein the writable area is contained within an annular area of the optical disk, the annular area having an inner diameter and an outer diameter, and wherein the first end of the spiral track is adjacent the outer diameter and the remaining end of the spiral track is adjacent the inner diameter.

6. The method of claim 1, wherein each system sector comprises:

a directory identification parameter that is used to determine when to terminate the process of reading the system sector(s).

7. The method of claim 1, wherein each system sector further comprises:

a file identification parameter that is used to determine when to terminate the process of reading the system sector(s).

8. The method of claim 1, wherein each system sector includes:

a data block number that indicates the next available writeable location for a data file.

9. A write-once read-many (WORM) optical disk, comprising:

a writeable area on the optical disk, wherein the writeable area is formed in a spiral track, the spiral track forming a data area starting at a first end of the spiral track and extending towards the remaining end and forming a system sector starting at the remaining end and extending towards the first end, wherein the data area comprises a plurality of data files and the system sector identifies the location and size of the data files; the writable area including:

an updated system sector for accessing only updated data files, the updated system sector being written in the writable area starting from the end of the system sector towards the data area along the spiral track, the updated system sector identifying the location and size of the updated data files, the information for accessing the data files that were not updated being stored in the system sector.

10. The optical disk of claim 9, wherein each system sector comprises:

a directory identification parameter that is used to determine when to terminate the process of reading each of the system sectors.

11. The optical disk of claim 10, wherein each system sector comprises:

a file identification parameter that is used to determine when to terminate the process of reading each of the system sectors.

12. The optical disk of claim 9, wherein each system sector includes:

a writeable data block number that indicates the next available location for a data file.

* * * * *